Dec. 29, 1964 M. HOESER 3,163,746

MARK SENSING DEVICE

Filed July 15, 1959 2 Sheets-Sheet 1

Dec. 29, 1964

M. HOESER 3,163,746

MARK SENSING DEVICE

Filed July 15, 1959

2 Sheets-Sheet 2

3,163,746

MARK SENSING DEVICE

Manfred Hoeser, Frankfurt am Main-Roedelheim, Germany, assignor to Sperry Rand Corporation, New York, N.Y., a corporation of Delaware Filed July 15, 1959, Ser. No. 827,395

Claims priority, application Germany July 18, 1958

7 Claims. (Cl. 235—61.11)

This invention relates to a device for the direct evaluation of markings on a medium, more especially on punch cards, by means of a light source and a photo-electric transducer.

The device according to the invention makes it possible to sense, store, and evaluate graphic markings directly on a medium such as a punch card. The sensing of cards, for example for statistical evaluations, is already known. It has been proposed to define areas on cards divided into lines and columns by means of a relatively long, electrically conductive line, and subsequently to pass the cards under a sensing device provided with a pair of brushes for each individual column, which pass current when both make contact with the marked area, thus causing an indication or the like.

A further proposal involves the photo-electric sensing of markings carried on a special kind of transparent card. This requires intense markings and the card must not contain any flaws since the light which falls on the sensing photocell must pass through the card. The special type of card will only permit rather weak printing in pale green. As in the above-mentioned method, the marking columns on this card must not be punched.

In order to eliminate these various disadvantages the invention provides a device for the direct evaluation of markings on a marking medium, more especially on punch cards, by means of a light source and a photo-electric transducer, the special feature of which consists in that the light source and the transducer controlling the evaluation device are arranged on the same side of the marking medium. This method allows the sensing sensitivity to be increased enormously, owing to the fact that the transducer will only intercept reflected light. Ordinary wood-pulp card may be used since the light does not have to pass through it and only the reflection characteristics of the card surface are of importance. In one embodiment a polarised photo-conductor is used to serve as the photo-electric transducer. For this purpose, photo-diodes or photocells with a narrow spectrum band sensitivity are particularly suitable. Thus, it becomes possible to eliminate colour influences almost entirely and, consequently, to allow for printing on the medium, i.e., a punch card, in various colours, or to make coloured marks for control purposes, without thereby affecting the operation of the photoelectric transducer.

Due to the exceptional sensitivity of the arrangement according to the invention simple circuitry is possible in the evaluation device.

An embodiment of the invention will be described by way of example with reference to the accompanying drawings, in which.

Figure 1:
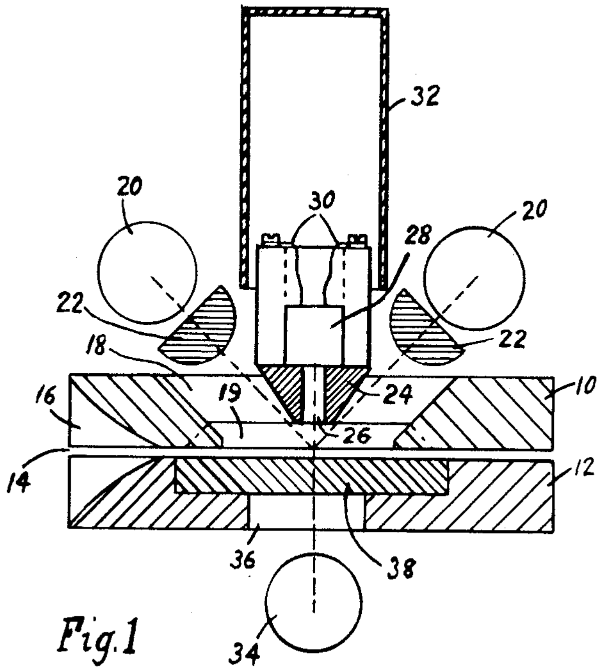
FIGURE 1 shows to an enlarged scale a section of a card sensing device according to the invention, taken on a plane normal to the card surface.

In FIGURE 1 a card guide is formed of plates 10 and 12, which are spaced to enable a punch card to be entered into the slit 14 between them. Plates 10 and 12 are provided with a flared opening 16 which facilitates the entry of the cards. The upper plate 10 has a central funnel-shaped recess 18 with its narrow end at the bottom. The lower edges of the recess are spanned by transverse bars 19, each located at the border between two card columns, which prevent the cards from fouling the edges of the funnel 18. The housing 24 is disposed in the centre of the funnel, extends over the entire card width, and has a light duct 26 located between each two adjacent transverse bars. At both sides of the housing and above the plates 10 tubular lamps 20 are arranged in such a manner that the light emitted from these lamps is projected on to the card surface (not illustrated) underneath the duct 26. It is of primary importance that the card be so illuminated that reflected light reaches the ducts 26. To increase the light efficiency, a lens 22 is located in front of each lamp 20. Each lens is curved with respect to one axis only while in the vertical direction to the picture plane, each lens is predominantly cylindrical.

A photo-electric transducer 28, which could be a photocell, is located immediately above each duct 26 with its photo-sensitive surface directed towards the duct, so that light reflected from the card will reach the transducer. The transducer in the illustrated embodiment is preferably a polarised photo-conductor with a narrow spectrum band sensitivity for eliminating colour influences. The electric wiring 30 and the means for fastening the transducers are covered by a hood 32.

When a card travels from left to right through slit 14, the light emanating from lamps 20 and passing through lenses 22 will, after reflection, pass through the duct 26 and strike the light-sensitive side of the photo-conductor. The resistor characteristics change as the reflected light changes. If a dark spot appears under the duct 26, i.e., a pencil line, the amount of light striking the photo-conductor 28 is diminished and the electrical effect is utilised. Due to the low colour sensitivity coloured strokes or spots, or other spurious markings, will have no effect on the electrical resistance of the photo-conductor 28.

If the card is punched in one place, the light falling on the card surface will not be reflected but will pass through the punched hole. To enable prepunched cards to be sensed, a frosted glass pane 38 is provided, below the card, in plate 12, lighted from below by a tubular lamp 34. With appropriate selection of the glass pane 38 and the lamp 34, transducer 28 will receive an amount of light equivalent to the light reflected from an unpunched card. A broad slot 36 is provided in the plate 12 to permit passage of the light from lamp 34.

Figure 2:
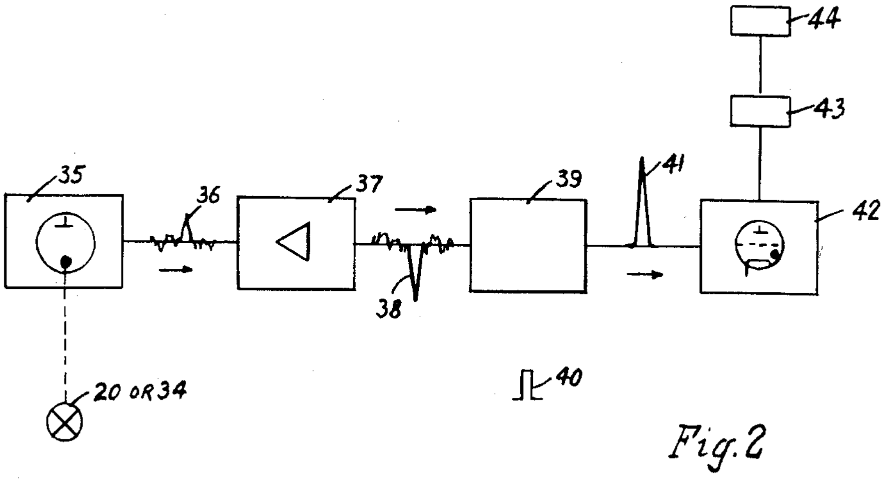
FIGURE 2 is a block schematic diagram of the transducer circuitry.

The block schematic diagram in FIGURE 2 shows the circuit of the photo-electric transducer simplified as a photocell. The light emitted by the lighting device 20 or 34 (see FIGURE 1) is converted in the transducer circuit 35 to a varying potential as shown at 36. This voltage is amplified in the A.C. amplifier 37, emerging as the wave 38, and conveyed to a limiter 39 in which the entire portion below a predetermined level is cut off. Only a positive rectangular impulse 40 remains since the peak of the marking impulse is cut also off when the tube contained in the limiter reaches its maximum amplitude. By differentiating the rectangular impulse, a sharp impulse 41 is produced, which is applied to a thyratron circuit 42 as a positive peak voltage impulse. This thyratron controls the relays 43, 44 assigned to the individual digits within a column.

Figure 3:
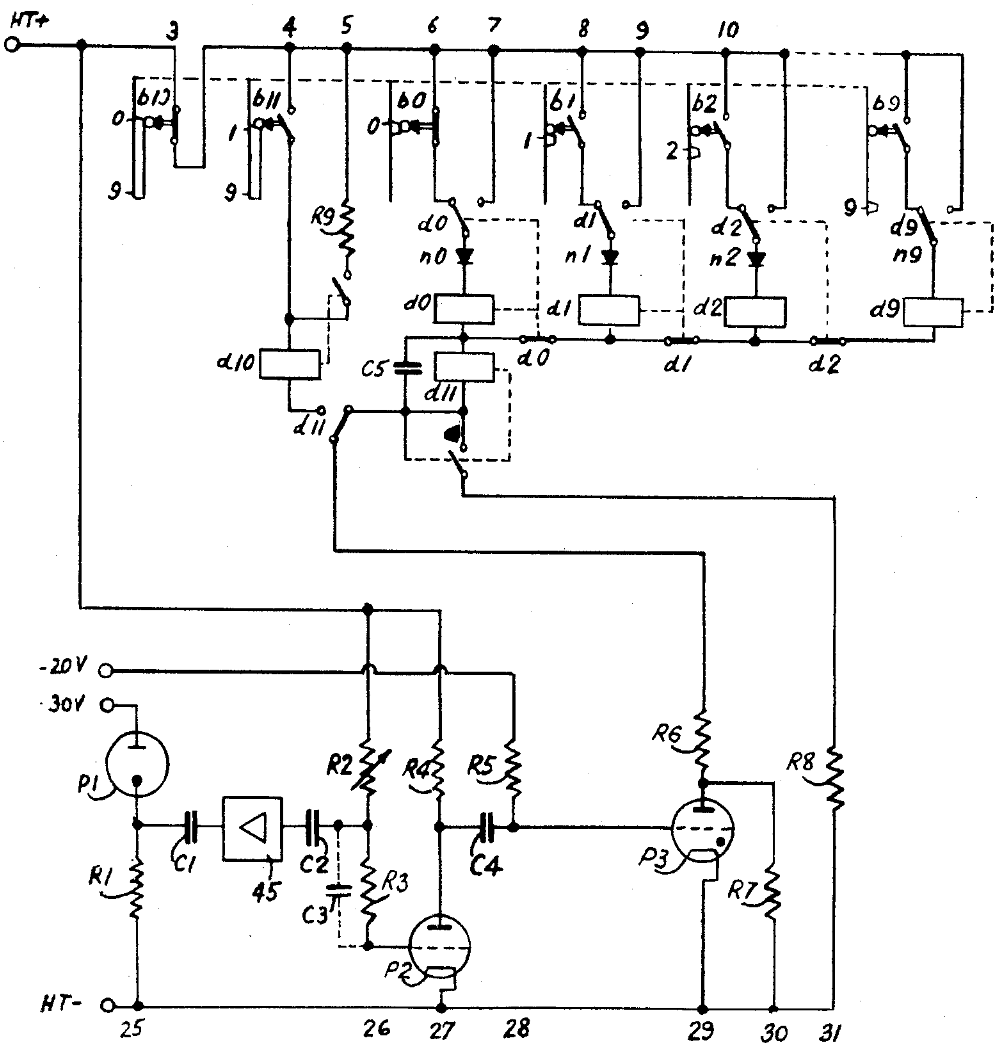
FIGURE 3 is a circuit diagram according to FIGURE 2.

Circuit details are shown in FIGURE 3. The polarised photo-conductor P1 (28 in FIGURE 1) is connected in the current path 25 between ground and a 30 volt negative potential. A fixed resistor R1 is interposed between ground and the photo-conductor. The voltage drop corresponding to the current flow through R1 is applied to a capacitor C1, which transmits the A.C. component thereof to A.C. amplifier 45. The amplified signal is fed to a limiter circuit via capacitor C2, where the negative half-waves are further amplified, while simultaneously the positive half-waves are completely suppressed. Negative impulses below a certain level are likewise suppressed. Only those negative A.C. voltage impulses which exceed the voltage drop in the fixed resistor R3 in current path 26 become effective at the grid of tube P2, in current path 27. Thus, the extent of the suppression of minor negative impulses is determined by the relation of the adjustable resistor R2 to the fixed resistor R3. Positive impulses are limited by the grid voltage and are suppressed in the resistor R3. The anode resistor R4 of tube P2 is so chosen that the permissible anode current of tube P2 is not exceeded, while the sum of R2 plus R3 is such that the permissible grid current cannot be exceeded. For higher frequencies a correcting capacitor C3 is provided. The entire limiter circuit serves to separate spurious impulses resulting from irregularities in the punch card material, imprints, or irregularities in the working impulse, thereby preventing the improper firing of the thyratron connected to the output side. The amplification of the limiter circuit is determined by the type of tube P2 and the size of resistor R4 and is not affected by the setting of the limiter.

The anode impulses are transmitted through a differentiating capacitor C4 and to the grid of a gaseous discharge tube P3 in current path 29. The grid of P3 is negatively biased to −20 volts via resistor R5 in current path 28. The anode of thyratron P3 is grounded via a high value resistor R7 in current path 30.

The relay circuit assigned to a card column and controlled by thydratron P3 is shown in the upper part of FIGURE 3. Cam-controlled contacts *b0* to *b9* are connected in series with numeral relays *d0* to *d9* respectively in current path 6, 8, 10 etc. These contacts, dependent upon the position of the travelling card, are controlled in such a manner that the respective contact is closed when the card is located in the position assigned to the respective relay. Thus, for example, contact *b0* is closed when the card is fed up to the digit 0 position of the respective column through card guide slit 14. A contact *b10* in current path 3 is connected in series with the entire relay circuit. It is closed during the card run within positions 0–9 and when opened effects the de-energisation of the entire relay circuit. Relays *d0* to *d9*, together with other contacts not shown on the drawing may, for example, activate the die pin locking actuators for the punching of cards. In the outlined type of operation the limiter circuit is connected to the same positive voltage as the thyratron and relay circuits. However, it is also possible to provide the positive voltage for the limiter from a different source.

The circuit operation is as follows:

When a card enters the machine, contact *b10* is closed. In position 0 contact *b0* closes. In consequence, current can reach the anode of thyratron P3 via switch *b0*, change-over switch of relay *d0*, its rectifier *n0*, relay coils *d0* and *d11*, the change-over switch of relay *d11* and the anode resistor R6 in current path 29. As long as the card is within the range of position 0, contact *b0* will remain closed. If the thyratron is fired while contact *b0* is closed, current will flow from the H.T. line through the thyratron, thus operating relay *d0*. This relay operates very rapidly because capacitor C5 permits a high current peak at the firing of the thyratron. The contacts of the change-over switch *d0* are arranged in make-before-break order so that the self-holding current path 7 is first closed and the current path 6 to contact *b0* is subsequently opened. Relay *d11*, which is assigned to the remaining relay circuit, operates a little later, after the charging of capacitor C5. This relay holds itself via the limiting resistor R8 in current path 31 and cuts off the thyration. The relay *d11* contact connects the thyratron to relay coil *d10* in current path 4. Now relay *d0* is held through relay *d11* and its self-holding current path 31.

The circuitry associated with contact *b11* in current paths 4 and 5 takes care of error indication, in particular the indication of double marks. The cam-controlled contact *b11* will be closed from position 1 to the completion of the card run. As a result of the closure of contact *b11* from position 1 on, the thyratron anode is energised. In case the thyratron should again fire—due to a double marking in the respective column—relay *d10* operates and holds itself in by the current through resistor R9 in current path 5. Now the thyratron will remain fired until completion of the card run, and contacts of the operated relay not shown on the drawing may be used for the indication of double marks or similar errors.

The circuit functions in the same way with all numerals following the "0." If, for example, the thyratron does not fire while contact *b0* is closed, relays *d0*, *d11* and *d10* cannot operate and the circuit will remain inoperative, at least until switch *b1* in current path 8 closes when the card passes to position 1. If position 1 is marked, thyratron P3 is fired via the grip impulse, the H.T. potential having been applied to the anode by the closing of *b1*. The above described procedure is repeated with the exception that in this instance the current paths are 8 and 9 in place of 6 and 7.

The above described circuit will permit an extremely high speed, i.e., 9000 card runs per hour. Further, no stabilisation is necessary.

The device according to the invention further permits a marking of cards on both sides because the reflected light is used for sensing instead of the transmitted light.

If photo-electric element 28 or P1 is connected to a corresponding circuit, the device may also be utilized for the sensing of holes in punched cards. For this purpose, light sources 20 are extinguished and light source 34 turned on.

It is, furthermore, possible to punch sensed information into the very card from which it was sensed. Relays *d10* and *d11* may be used to segregate cards automatically without previously stopping the entire machine function.

What is claimed and desired to be secured by Letters Patent is:

1. A device for sensing marks on a record feeding past a sensing station comprising, a first light source directed to illuminate one surface of a record being conveyed past such sensing station, photo-cell means disposed to receive the light of said source reflected from said one surface of said record, said photo-cell means producing a control signal in response to a significant variation in the intensity of the light reflected from said one surface of the record resulting from a mark on said one surface, and an additional light source disposed to illuminate the other opposed surface of said record feeding past said sensing station, said additional light source being directed towards said photo-cell means and providing an intensity at said photo-cell means, when unobstructed by the record at said sensing station, substantially equal to the intensity of light from said first light source reflected by an unmarked area of said one surface.

2. A device according to claim 1 wherein said first light source is disposed in a position from whence the light reflected towards said photo-cell means is directed to said one surface along a path extending obliquely to the plane of said one surface of said record when at said sensing station.

3. A device according to claim 2 including a second light source disposed in opposed relation to said first-mentioned light source, said second light source being directed to illuminate simultaneously with said first light source the same area of said one surface of the record, said photo-cell means being disposed to receive light from both of said first and second light sources simultaneously reflected by said one surface of the record.

4. A mark sensing device for continuously feeding records having marking positions located at the intersection of columns and rows extending over the record surface comprising, a sensing station, said sensing station comprising a portion of the record feed path of an extent corresponding to one row of marking positions, a light source directed onto the surface area of a record feeding through said sensing station, separate photo-cell means for each separate record column, said photo-cell means being disposed in the light of said light source as reflected from the surface area of a record at the sensing station station, each separate photo-cell means being responsive to a significant variation in the intensity of reflected light for generating a control signal, and means controlled by said photocell means and operating in synchronism with the feed of said record for manifesting the marking position of a column in which a control signal is generated, and including an additional light source disposed to direct light on the opposite surface of said record feeding through said sensing station and in a direction towards each of said photo-cell means, said additional light source providing an intensity when directly exposed to said photo-cell means substantially equal to the intensity of the light from said first-mentioned light source reflected towards said photo-cell means by the surface of said record.

5. The device according to claim 4 including light diffusing means disposed between said record and said additional light source.

6. A mark sensing device for continuously feeding records having marking positions located at the intersection of columns and rows extending over the record surface comprising, a sensing station, said sensing station comprising a portion of the record feed path of an extent corresponding to one row of marking positions, a light source directed onto the surface area of a record feeding through said sensing station, separate photo-cell means for each separate record column, said photo-cell means being disposed in the light of said light source as reflected from the surface area of a record at the sensing station, each separate photo-cell means being responsive to a significant variation in the intensity of reflected light for generating a control signal, and means controlled by said photo-cell means and operating in synchronism with the feed of said record for manifesting the marking position of a column in which a control signal is generated, and including means for shielding the separate photo-cell means associated with one record column from light reflected from any other record column, said means including spaced apart transverse bars separating the light receiving axis of the respective photo-cell means and serving also to guide a record in its feed through said sensing station.

7. A mark sensing device for continuously feeding records having marking positions located at the intersection of columns and rows extending over the record surface comprising, a sensing station, said sensing station comprising a portion of the record feed path of an extent corresponding to one row of marking positions, a light source directed onto the surface area of a record feeding through said sensing station, separate photo-cell means for each separate record column, said photo-cell means being disposed in the light of said light source as reflected from the surface area of a record at the sensing station, each separate photo-cell means being responsive to a significant variation in the intensity of reflected light for generating a control signal, and means controlled by said photo-cell means and operating in synchronism with the feed of said record for manifesting the marking position of a column in which a control signal is generated, wherein said marking position manifesting means comprises circuit means operating in response to the control signal produced by said photo-cell means including, means for amplifying said control signal, a plurality of control elements including one for each successive marking position of said record, each of said elements being operable in response to receipt of an amplified signal for identifying its associated marking position, and means for conditioning each of said elements successively for receipt of an amplified signal in synchronism with the passage of corresponding marking positions of said record past said sensing station, including change-over means rendered effective upon the operation of any one of said elements, said change-over means when rendered effective by the operation of one of said elements disconnecting all said elements form said amplifying means to prevent operation of any other of said elements by said amplifying means when energized by a subsequently generated control signal, and including a separate error indicating element conditioned by operation of said change-over means to receive an amplified signal, whereby indication is provided of the sensing of more than one mark on said record in succession.

References Cited in the file of this patent

UNITED STATES PATENTS

| | | |
|---|---|---|
| 1,763,208 | Altman | June 10, 1930 |
| 2,078,800 | Juchter | Apr. 27, 1937 |
| 2,268,498 | Bryce | Dec. 30, 1941 |
| 2,438,825 | Roth | Mar. 30, 1948 |
| 2,617,048 | Wagner | Nov. 4, 1952 |
| 2,745,021 | Kurshan | May 8, 1956 |
| 2,774,821 | Brown et al. | Dec. 18, 1956 |
| 2,899,132 | Orthuber | Aug. 11, 1959 |
| 2,933,246 | Rabinow | Apr. 19, 1960 |
| 2,938,666 | Rand | May 31, 1960 |
| 2,939,124 | Saxenmeyer | May 31, 1960 |
| 2,940,663 | Fechter et al. | June 14, 1960 |

FOREIGN PATENTS

| | | |
|---|---|---|
| 694,365 | Great Britain | July 22, 1953 |
| 777,557 | Great Britain | June 26, 1957 |

UNITED STATES PATENT OFFICE

CERTIFICATE OF CORRECTION

Patent No. 3,163,746 December 29, 1964

Manfred Hoeser

It is hereby certified that error appears in the above numbered patent requiring correction and that the said Letters Patent should read as corrected below.

Column 5, line 10, strike out "station"; column 6, line 29, for "form" read -- from --.

Signed and sealed this 26th day of October 1965.

(SEAL)
Attest:

ERNEST W. SWIDER
Attesting Officer

EDWARD J. BRENNER
Commissioner of Patents